US008682899B2

(12) United States Patent
Sonoda et al.

(10) Patent No.: US 8,682,899 B2
(45) Date of Patent: Mar. 25, 2014

(54) APPARATUS AND METHOD FOR MANAGING SYSTEMS EACH INCLUDING A PLURALITY OF CONFIGURATION ITEMS

(75) Inventors: Masataka Sonoda, Kawasaki (JP); Yasuhide Matsumoto, Kawasaki (JP); Yukihiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/482,288

(22) Filed: May 29, 2012

(65) Prior Publication Data

US 2012/0317116 A1 Dec. 13, 2012

(30) Foreign Application Priority Data

Jun. 8, 2011 (JP) ................................. 2011-128670

(51) Int. Cl.
*G06F 17/30* (2006.01)
(52) U.S. Cl.
USPC ........................................................ 707/737
(58) Field of Classification Search
USPC ........................................................ 707/737
See application file for complete search history.

(56) References Cited

U.S. PATENT DOCUMENTS

2011/0145383 A1* 6/2011 Bishop et al. ................. 709/223
2011/0173500 A1 7/2011 Sonoda et al.

FOREIGN PATENT DOCUMENTS

| JP | 2003-179601 | 6/2003 |
| JP | 2004-62741 | 2/2004 |
| JP | 2009-003743 | 1/2009 |

* cited by examiner

*Primary Examiner* — Joshua Bullock
(74) *Attorney, Agent, or Firm* — Staas & Halsey LLP

(57) ABSTRACT

An apparatus generates configuration group information by classifying, based on first log information storing messages outputted by a first plurality of configuration items of a first system, into first configuration groups each including one or more configuration items that have outputted messages having a commonality. The apparatus generates relation class information that defines, in association with the first configuration groups, first one or more message propagation relations. The apparatus classifies a second plurality of configuration items of a second system into second configuration groups included in the first configuration groups, based on the configuration group information and second log information storing messages outputted by the second plurality of configuration items, and applies second one or more message propagation relations that are associated, by the relation class information, with third configuration groups included in the second configuration groups, to the second plurality of configuration items.

7 Claims, 15 Drawing Sheets

FIG. 3A

```
                                                    ~102a
<Graph>
  <CISet>
    <CI id="CI_a" />
    ...
    <CI id="CI_d" />
  </CISet>
  <RelSet>
    <Relation id="r1" src="CI_a" dst="CI_b" />
    <Relation id="r2" src="CI_b" dst="CI_c" />
    ...
  </RelSet>
</Graph>
```

FIG. 3B

```
                                            ~103a
date,   CI,      (msg ID)msg
t01,    CI_a,    (01) Can't read record in system table.
t02,    CI_b,    (02) ERROR: [YYY] aaa bbb ccc ...
t03,    CI_c,    (03) "GET / HTTP/1.0" 503 XXX
t04,    CI_d,    (03) "GET / HTTP/1.0" 503 XXX
t05,    CI_a,    (04) Can't find record in xx yy zz.
t06,    CI_b,    (05) An exception or error occurred ...
t07,    CI_c,    (06) Execution delay: 900 ms
t08,    CI_d,    (06) Execution delay: 900 ms
```

| FAILURE | OCCURRENCE TIME | RECOVERY TIME |
|---|---|---|
| HDD FAILURE 01 | 07/12/2010 03:30:00 | 07/12/2010 03:35:25 |
| ... | ... | ... |

| ID | PROPAGATION SOURCE FAILURE | | PROPAGATION DESTINATION FAILURE | |
|---|---|---|---|---|
| | CI | msg | CI | msg |
| r1 | CI_a | msg1 | CI_b | msg2 |
| r2 | CI_a | msg1 | CI_c | msg3 |
| r3 | CI_a | msg2 | CI_c | msg3 |
| r4 | CI_a | msg1 | CI_d | msg3 |
| r5 | CI_b | msg2 | CI_d | msg3 |

| msg ID | msg |
|---|---|
| 01 | Can't read record in system table. |
| 02 | ERROR: [YYY] aaa bbb ccc. |
| 03 | "GET / HTTP/1.0" 503 XXX |
| 04 | Can't find record in xx yy zz. |
| 05 | An exception or error occurred. |
| 06 | Execution delay: 900 ms |
| 07 | Number of packets over the threshold. |

| CI | (msg ID)msg |
|---|---|
| CI_a | • (01) Can't read record in system table.<br>• (04) Can't find record in xx yy zz. |
| CI_b | • (02) ERROR: [YYY] aaa bbb ccc.<br>• (05) An exception or error occurred. |
| CI_c | • (03) "GET / HTTP/1.0" 503 XXX<br>• (06) Execution delay: 900 ms |
| CI_d | • (03) "GET / HTTP/1.0" 503 XXX<br>• (06) Execution delay: 900 ms |

FIG. 4A

```
                                    202a
<Graph>
   <CISet>
      <CI id="CI_1" />
      <CI id="CI_2" />
      <CI id="CI_3" />
      <CI id="CI_4" />
   </CISet>
</Graph>
```

| date, | CI,   | (msg ID)msg |
|-------|-------|-------------|
| t11,  | CI_4, | (01) Can't read record in system ... |
| t12,  | CI_3, | (02) ERROR: [YYY] aaa bbb ccc ... |
| t13,  | CI_4, | (04) Can't find record in xx yy zz. |
| t14,  | CI_1, | (03) "GET / HTTP/1.0" 503 XXX |
| t15,  | CI_3, | (05) Error or Exception occurred .. |
| t16,  | CI_1, | (06) Execution delay: 900 ms |
| t17,  | CI_2, | (03) "GET / HTTP/1.0" 503 XXX |
| t18,  | CI_2, | (06) Execution delay: 900 ms |

| msg ID | msg |
|---|---|
| 01 | Can't read record in system table. |
| 02 | ERROR: [YYY] aaa bbb ccc. |
| 03 | "GET / HTTP/1.0" 503 XXX |
| 04 | Can't find record in xx yy zz. |
| 05 | An exception or error occurred. |
| 06 | Execution delay: 900 ms |

| CI | (msg ID)msg |
|---|---|
| CI_1 | • (03) "GET / HTTP/1.0" 503 XXX<br>• (06) Execution delay: 900 ms |
| CI_2 | • (03) "GET / HTTP/1.0" 503 XXX<br>• (06) Execution delay: 900 ms |
| CI_3 | • (02) ERROR: [YYY] aaa bbb ccc.<br>• (05) Error or Exception occurred. |
| CI_4 | • (01) Can't read record in system table.<br>• (04) Can't find record in xx yy zz. |

| CI TYPE | (msg ID)msg |
|---|---|
| type1 | • (01) Can't read record in system table.<br>• (04) Can't find record in xx yy zz. |
| type2 | • (02) ERROR: [YYY] aaa bbb ccc.<br>• (05) An exception or error occurred. |
| type3 | • (03) "GET / HTTP/1.0" 503 XXX<br>• (06) Execution delay: 900 ms<br>• (07) Number of packets over the threshold. |

| | PROPAGATION SOURCE FAILURE | | PROPAGATION DESTINATION FAILURE | |
|---|---|---|---|---|
| ID | CI TYPE | msg | CI TYPE | msg |
| C1 | type1 | Can't read record in system table. | type2 | ERROR: [YYY] aaa bbb ccc. |
| C2 | type1 | Can't read record in system table. | type3 | Number of packets over the threshold. |
| C3 | type2 | ERROR: [YYY] aaa bbb ccc. | type3 | "GET / HTTP/1.0" 503 XXX |

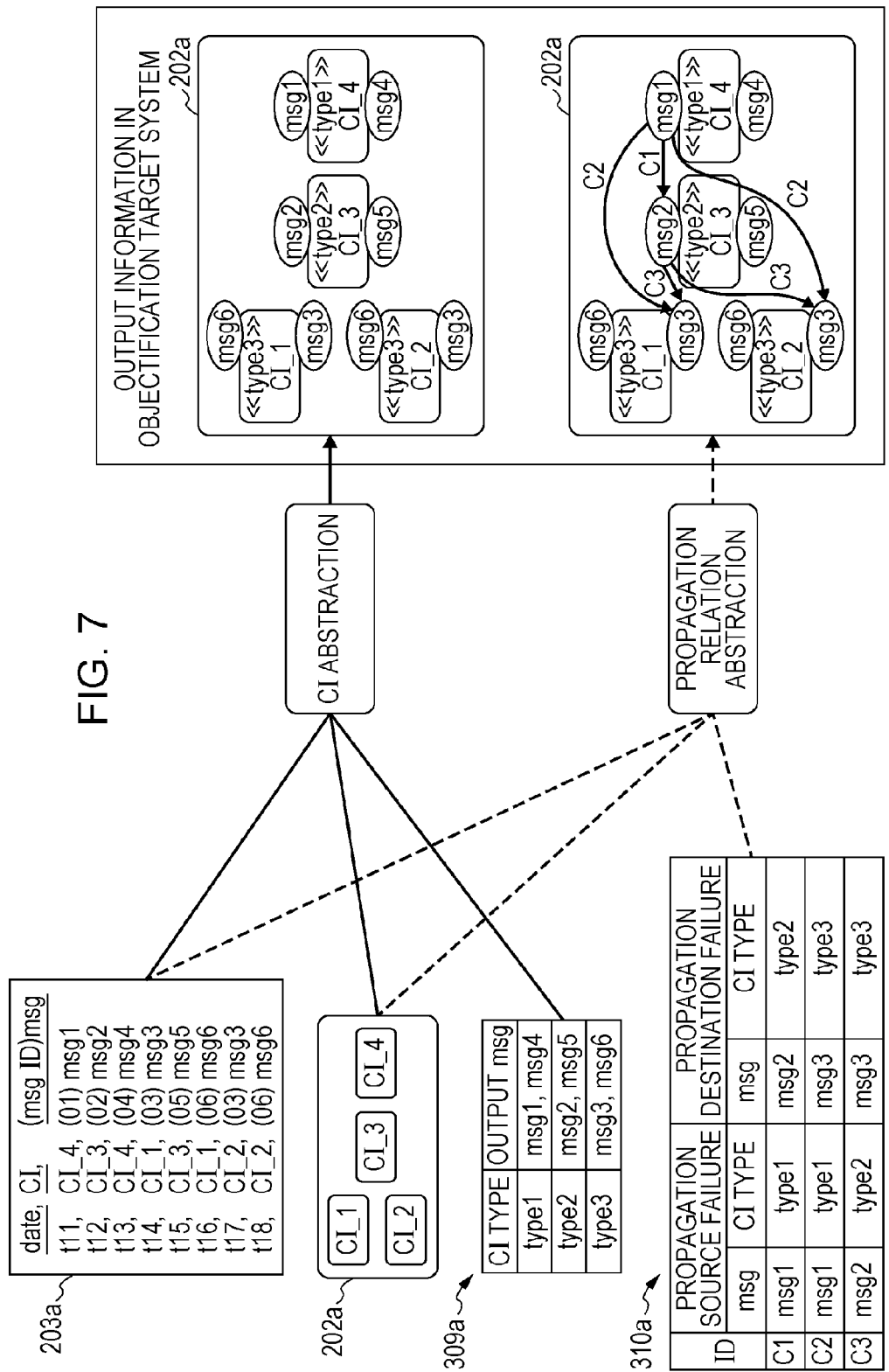

FIG. 8

```
                                                            ~202a
<Graph>
  <CISet>
    <CI id="CI_1" type="type3"/>
    <CI id="CI_2" type="type3"/>
    <CI id="CI_3" type="type2"/>
    <CI id="CI_4" type="type1"/>
  </CISet>
  <RelSet>
    <Relation id="r1" src="CI_4" dst="CI_3" class="C1" />
    <Relation id="r2" src="CI_4" dst="CI_1" class="C2" />
    <Relation id="r3" src="CI_4" dst="CI_2" class="C2" />
    <Relation id="r4" src="CI_3" dst="CI_1" class="C3" />
    <Relation id="r5" src="CI_3" dst="CI_2" class="C3" />
    ...
  </RelSet>
</Graph>
```

APPARATUS AND METHOD FOR MANAGING SYSTEMS EACH INCLUDING A PLURALITY OF CONFIGURATION ITEMS

CROSS-REFERENCE TO RELATED APPLICATION

This application is based upon and claims the benefit of priority of the prior Japanese Patent Application No. 2011-128670, filed on Jun. 8, 2011, the entire contents of which are incorporated herein by reference.

FIELD

The embodiments discussed herein are related to an apparatus and method for managing systems each including a plurality of configuration items.

BACKGROUND

In a system where multiple configuration items are connected, since a management becomes more difficult to carry out as the number of configuration items is increased, various management technologies for the system are proposed. For example, a technology of accumulating operating status information on the configuration item in the system and determining a failure of the configuration item in the system on the basis of the accumulated operating status information is proposed. Also, a technology of previously storing information on a cause-effect relation of the failure between the configuration items in the system and in a case where the failure occurs, narrowing down a cause location of the failure on the basis of the previously stored information on the cause-effect relation of the failure is proposed. In addition, a technology of visually recognizing the cause location of the failure is proposed.

For example, see Japanese Laid-open Patent Publication No. 2004-62741, Japanese Laid-open Patent Publication No. 2003-179601, and Japanese Laid-open Patent Publication No. 2009-3743.

SUMMARY

According to an aspect of the invention, there is provided an apparatus for managing systems each including a plurality of configuration items. The apparatus generates configuration group information by classifying, based on first log information storing messages that were outputted by a first plurality of configuration items of a first system, into first configuration groups each including one or more configuration items that have outputted messages having a commonality, so that the configuration group information stores identifier identifying each of the first configuration groups in association with messages outputted by the one or more configuration items included in the each of the first configuration groups. The apparatus further generates relation class information that defines, in association with the first configuration groups, first one or more message propagation relations indicating propagation relations of messages outputted by configuration items belonging to the first configuration groups, based on the configuration group information and propagation relations between messages outputted by the first plurality of configuration items, wherein a propagation relation between messages indicates a relationship, between first and second messages, in which the first message outputted by a propagation source configuration item has caused the second message outputted by a propagation destination configuration item. Then the apparatus classifies a second plurality of configuration items of a second system into second configuration groups included in the first configuration groups, based on the configuration group information and second log information storing messages outputted by the second plurality of configuration items. The apparatus applies second one or more message propagation relations that are associated, by the relation class information, with third configuration groups included in the second configuration groups, to the second plurality of configuration items.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is a diagram illustrating an example of configuration information of an abstraction target system, according to an embodiment;

FIG. 3B is a diagram illustrating an example of log information of an abstraction target system, according to an embodiment;

FIG. 3C illustrates an example of failure case information in the abstraction target system, according to an embodiment;

FIG. 3D is a diagram illustrating an example of propagation relation information in an abstraction target system, according to an embodiment;

FIG. 3E is a diagram illustrating an example of message dictionary information of an abstraction target system, according to an embodiment;

FIG. 3F illustrates an example of error message information organized by CI in the abstraction target system, according to an embodiment;

FIG. 4A illustrates an example of configuration information of an objectification target system, according to an embodiment;

FIG. 4B is a diagram illustrating an example of log information of an objectification target system, according to an embodiment;

FIG. 4C is a diagram illustrating an example of message dictionary information of an objectification target system, according to an embodiment;

FIG. 4D is a diagram illustrating an example of CI error message information of an objectification target system, according to an embodiment;

FIG. 5A is a diagram illustrating an example of CI type information, according to an embodiment;

FIG. 5B is a diagram illustrating an example of relation class information, according to an embodiment;

FIG. 7 is a diagram illustrating a processing example of a CI objectification and a propagation relation objectification, according to an embodiment;

FIG. 8 is a diagram illustrating an example of configuration information of an objectification target system on which propagation relation information is reflected, according to an embodiment;

DESCRIPTION OF EMBODIMENTS

According to the conventional technology as described above, in some cases, it may be difficult to determine the failure of the configuration item in the system on the basis of the accumulated operating status information, for example, immediately after the operation start of the system or immediately after the configuration change, because of no or little accumulation of the operating status information. Also, when the configuration of the system is changed, in some cases, it may be difficult to narrow down the cause location of the failure on the basis of the cause-effect relation of the failure between the configuration items in the system before the change. In addition, since the cause-effect relation of the failure between the configuration items in the system is changed in accordance with the change in the system configuration, large man hours may be required, in some cases, in order to narrow down the cause location of the failure.

Hereinafter, a system management apparatus, a system management method, and a system management program according to embodiments will be described in detail with reference to the drawings.

First Embodiment (System Configuration Example According to a First Embodiment)

Figure 1:
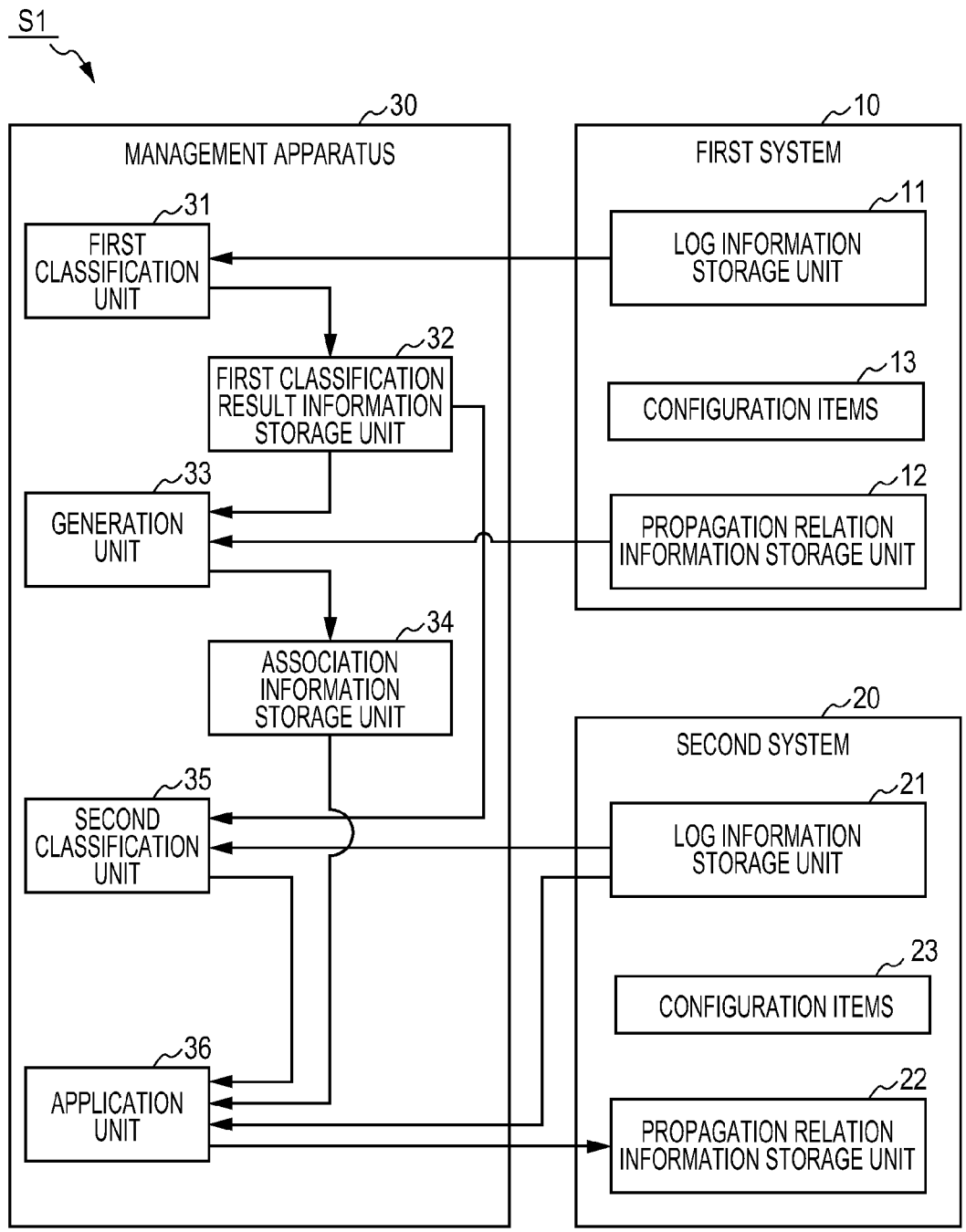
FIG. 1 is a diagram illustrating a configuration example of a management system, according to an embodiment.

FIG. 1 is a diagram illustrating a configuration example of a management system, according to an embodiment. A management system 51 illustrated in FIG. 1 includes a first system 10, a second system 20, and a management apparatus 30. The management apparatus 30 is communicably connected to both the first system 10 and the second system 20.

The first system 10 includes a plurality of configuration items (CIs) 13 managed by a configuration management database which is not depicted in FIG. 1. The configuration management database of the first system 10 stores information on the respective CIs included in the first system 10 (hereinafter which will be referred to as CI information) and information indicating a relation between the respective CIs (hereinafter which will be referred to as CI relation information). The first system 10 further includes a log information storage unit 11 that stores messages outputted by the respective CIs in the first system 10 as log information. The first system 10 may be configured to include a control unit that controls an entirety of the first system 10 and an interface that controls a communication with the management apparatus 30.

The first system 10 further includes a propagation relation information storage unit 12 that stores information on propagation relations of messages based on the CI relation information on the first system 10 (hereinafter which will be referred to as propagation relation information). The propagation relation information is information on cause-effect relationship between a pair of CIs, and indicates a propagation of a message in which, within a predetermined period of time since an occurrence of a first event corresponding to a first message that was outputted from a CI (i) at a propagation source (hereinafter, also referred to as "a propagation source configuration item"), a second event derived from the first event at the propagation source occurs at a CI (j) (j≠i) of a propagation destination (hereinafter, also referred to as "a propagation destination configuration item"), and, at the same time, a second message regarding the second event is outputted. The propagation relation information storage unit 12 stores first propagation relation information indicating a correspondence, in the first system 10, between a propagation source of the CI (i) that outputted a first message and a propagation destination of the CI (j) that outputted a second message.

The second system 20 may be configured to include configuration items (CIs) 23 managed by a configuration management database (not depicted in FIG. 1). The configuration management database of the second system 20 stores CI information on the respective CIs included in the second system 20. The second system 20 further includes a log information storage unit 21 that stores, as log information, messages outputted by the respective CIs in the second system 20. The second system 20 further includes a propagation relation information storage unit 22 that stores second propagation relation information indicating propagation relations between messages in the second system 20, which is generated on the basis of the first propagation relation information in the first system 10. The second system 20 may be configured to include a control unit that controls an entirety of the second system 20 and an interface that controls a communication with the management apparatus 30.

The management apparatus 30 may be configured to include a first classification unit 31, a first classification result information storage unit 32, a generation unit 33, an association information storage unit 34, a second classification unit 35, and an application unit 36. The management apparatus 30 may be configured to include a control unit that controls an entirety of the management apparatus 30 and an interface that controls a communication with the first system 10 and the second system 20.

The first classification unit 31 refers to the log information storage unit 11 of the first system 10 and classifies the respective CIs into groups of CIs (hereinafter which will be referred to as CI groups or configuration groups) on the basis of a commonality between the messages outputted by the respective CIs in the first system 10. The first classification unit 31 stores information on the result of classifying the respective CIs (hereinafter which will be referred to as first classification result information or configuration group information) indicating a correspondence between information identifying the respective CI groups and the messages outputted by the respective CIs classified into the respective CI groups, in the first classification result information storage unit 32.

The generation unit 33 generates association information indicating a propagation relation of the messages between the CI groups, based on the first classification result information and the first propagation relation information. That is, based on a commonality between the message indicated by the first classification result information and the message indicated by the first propagation relation information, the generation unit 33 classifies each of the CIs indicated by the first propagation relation information into one of the CI groups indicated by the first classification result information. Then, the generation unit 33 generates association information indicating propagation relations between messages outputted from the CI group at the propagation source and messages outputted from the CI group at the propagation destination, on the basis of the first propagation relation information, and stores the generated association information in the association information storage unit 34.

The second classification unit 35 refers to the log information storage unit 21 of the second system 20 and classifies the CIs that outputted the messages having a commonality in the second system 20 into one of the CI groups indicated by the first classification result information. The second classification unit 35 outputs, to the application unit 36, information on the result of classifying the CIs (hereinafter which will be referred to as second classification result information) indicating a correspondence between information identifying each of the CI groups (hereinafter which will be referred to as CI group identification information) and messages outputted by the CIs that were classified into the each CI group.

The application unit 36 applies the association information stored in the association information storage unit 34 to the CI groups and the messages that are indicated by the second classification result information, so as to generate second propagation relation information indicating the propagation relation between the messages in the second system 20. That is, the application unit 36 selects, from among CI groups and messages that are indicated by the second classification result information, CI groups and messages that satisfy the message propagation relations defined by the association information. The application unit 36 generates the second propagation relation information indicating the propagation relation between messages in the second system 20 using the message propagation relations that are satisfied by the selected CI groups and messages and defined by the association information. The application unit 36 stores the generated second propagation relation information in the propagation relation information storage unit 22.

It is noted that according to the first embodiment, messages at various levels of importance such as an error message, a warning message, and a caution message may be outputted by the respective CIs in both the first system 10 and the second system 20. For example, by generating the second propagation relation information from the first propagation relation information regarding the warning message, information on how an event that may lead to a failure occurrence propagates among the CIs is diverted and employed between different systems even when the failure does not actually occur in the intended system.

The first classification unit 31, the generation unit 33, the second classification unit 35, and the application unit 36 according to the first embodiment may be implemented, for example, by an integrated circuit such as an ASIC, a CPU, or an MPU. The ASIC stands for "Application Specific Integrated Circuit", the CPU stands for "Central Processing Unit", and the MPU stands for "Micro Processing Unit". Also, the first classification result information storage unit 32 and the association information storage unit 34 may be implemented, for example, by a storage apparatus using a RAM (Random Access Memory), a flash memory, a magnetic disc, an optical disc, or an opto-magnetic disc as a storage medium.

The management apparatus 30 uses the first classification result information where the message outputted by each of the CIs in the first system 10 is classified into one of the CI groups, and generates association information indicating the correspondence between CI groups in association with the messages outputted by the CI groups, from the propagation relation information of the messages in the first system 10. Then, the management apparatus 30 classifies each of the CIs in the second system 20 into one of the CI groups indicated by the association information, and determines the classified result to be the second classification result. Then, the management apparatus 30 applies the association information, among CI groups and messages indicated by the second classification result information, to the CI groups and messages that satisfy the propagation relations defined by the association information.

In this way, the management apparatus 30 generates the second propagation relation information indicating the propagation relation between messages in the second system 20, based on the first propagation relation information indicating the propagation relation between messages in the first system 10. Therefore, even in a case where types of the respective CIs and associations between respective CIs are not defined in the second system 20, the cause-effect relations between the CIs in the first system 10 may be diverted and employed in the second system 20. As a result, for example, in a case where the messages outputted by the CIs in both the first system 10 and the second system 20 are the error messages, the cause-effect relations between the CIs in the first system 10 may be diverted and employed in the second system 20, and it is possible to easily generate the propagation relation information regarding the error messages in the second system 20.

Second Embodiment (System Configuration Example According to Second Embodiment)

Figure 2:
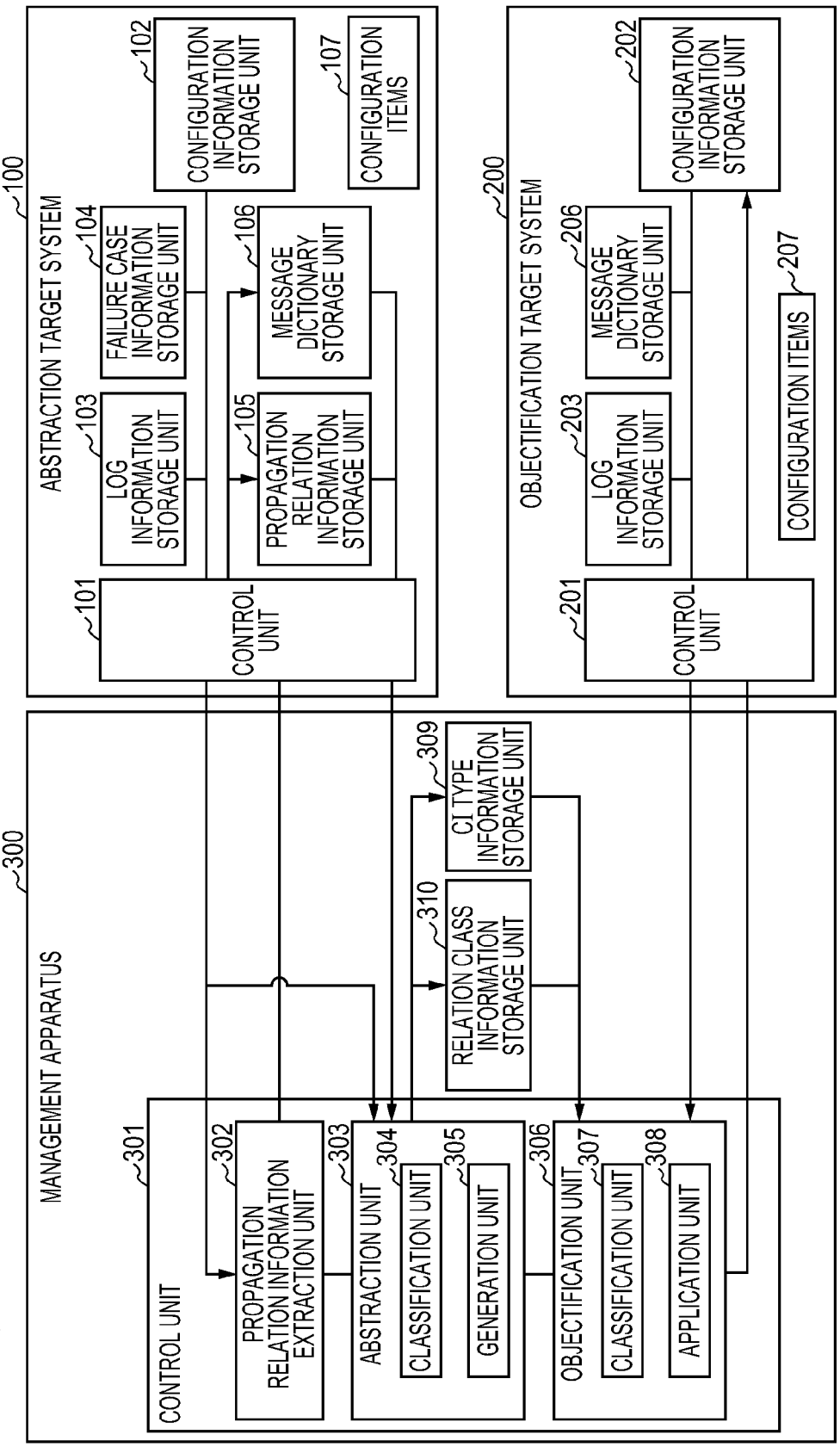
FIG. 2 is a diagram illustrating a configuration example of a management system, according to a second embodiment.

FIG. 2 is a diagram illustrating a configuration example of a management system, according to a second embodiment. A management system S2 illustrated in FIG. 2 includes an abstraction target system 100, an objectification target system 200, and a management apparatus 300. The management apparatus 300 is communicably connected to both the abstraction target system 100 and the objectification target system 200.

According to the second embodiment, a classification of the CIs having a commonality in the output error messages in the abstraction target system 100 into the same type of CI (hereinafter which will be referred to as a CI type) is referred to as "CI abstraction", and a CI classified into a CI type is referred to as "an abstracted CI". In addition, a classification of the propagation relation information of the failure (error) between the CIs in the abstraction target system 100 in terms of the CI type and the error message is referred to as "propagation relation abstraction", and the propagation relation information classified in terms of the CI type and the error message is referred to as "abstracted propagation relation information". The abstraction target system 100 is a system subjected to the CI abstraction and the propagation relation abstraction. Hereinafter, a propagation relation means the propagation relation of a failure unless otherwise noted.

Also, according to the second embodiment, by applying the result after the CI abstraction is carried out in the objectification target system 200 to the abstracted propagation relation information, the propagation relation information in the abstraction target system 100 is objectified in the objectification target system 200. The objectification target system 200 is a system corresponding to a target of the objectification of the abstracted propagation relation information.

The abstraction target system 100 may be configured to include a control unit 101, a configuration information storage unit 102, a log information storage unit 103, a failure case information storage unit 104, a propagation relation information storage unit 105, a message dictionary storage unit 106, and a plurality of configuration items (CIs) 107.

The control unit 101 governs an entire control of the abstraction target system 100, and controls data accesses to the configuration information storage unit 102, the log information storage unit 103, the failure case information storage unit 104, the propagation relation information storage unit 105, and the message dictionary storage unit 106.

The configuration information storage unit 102 serves as a CMDB (Configuration Management Database). The configuration information storage unit 102 manages information identifying CIs included in the abstraction target system 100 (hereinafter which will be referred to as CI identification information) and information on a connection relation between the CIs (hereinafter which will be referred to as the CI relation information), as the configuration information of the abstraction target system 100. The log information storage unit 103 stores at least one of an error message that was outputted by a CI in the abstraction target system 100 and a message ID identifying the error message, in association with CI identification information identifying the CI that outputted the error message. The failure case information storage unit 104 stores information on a failure case that occurred in the abstraction target system 100 (hereinafter which will be referred to as failure case information).

In the abstraction target system 100, the propagation relation information storage unit 105 stores the propagation relation information from one CI (i) to the other CI (j) (i≠j) with regard to a failure indicated by failure case information stored in the failure case information storage unit 104. Here, the propagation relation information is generated as information indicating that a failure is propagated from CI (i) to CI (j) when the failure occurs in CI (j) within a predetermined period of time since the failure occurred in CI (i) where CI (i) and CI (j) have a connecting relation.

The message dictionary storage unit 106 stores the message dictionary information in which an error message (msg) outputted by each of CIs in the abstraction target system 100 is stored in association with a message ID (msgID (IDentifier)) identifying the error message. It is noted that the message dictionary information stored in the message dictionary storage unit 106 is used for identifying the error messages when the message IDs are stored in the log information instead of the error messages outputted by the respective CIs. Therefore, when the error messages themselves outputted by the respective CIs are stored in the log information, the message dictionary storage unit 106 may be unnecessary.

The objectification target system 200 may be configured to include a control unit 201, a configuration information storage unit 202, a log information storage unit 203, a message dictionary storage unit 206, and a plurality of configuration items (CIs) 207.

The control unit 201 governs an entire control of the objectification target system 200 and controls data accesses to the configuration information storage unit 202, the log information storage unit 203, and the message dictionary storage unit 206.

The configuration information storage unit 202 may be configured as a CMDB and manage the CI identification information of the respective CIs included in the objectification target system 200 as the configuration information of the objectification target system 200. The log information storage unit 203 stores at least one of an error message outputted by each of CIs and a message ID identifying the error message, in association with CI identification information identifying the each CI that outputted the message.

The message dictionary storage unit 206 stores the message dictionary information in which a error message (msg) outputted by each of CIs in the objectification target system 200 is stored in association with a message ID (msgID (message IDentifier)) identifying the error message. It is noted that the message dictionary information stored in the message dictionary storage unit 206 is used for identifying the error messages when a message ID is stored in the log information instead of an error message outputted by each of CIs. Therefore, when the objectification target system 200 is configured so that an error message outputted by each of CIs is stored, on an as is basis, in the log information, the message dictionary storage unit 206 may be unnecessary.

The management apparatus 300 may be configured to include a control unit 301, a CI type information storage unit 309, and a relation class information storage unit 310. The control unit 301 governs an entire control of the management apparatus 300 and manages data accesses to the CI type information storage unit 309 and the relation class information storage unit 310. The control unit 301 includes a propagation relation information extraction unit 302, an abstraction unit 303, and an objectification unit 306. The abstraction unit 303 includes a classification unit 304 and a generation unit 305. Also, the objectification unit 306 includes a classification unit 307 and an application unit 308.

The propagation relation information extraction unit 302 refers to the configuration information storage unit 102, the log information storage unit 103, and the failure case information storage unit 104, and generates propagation relation information and message dictionary information that are stored in the propagation relation information storage unit 105 and the message dictionary storage unit 106, respectively. That is, the propagation relation information extraction unit 302 generates propagation relation information indicating propagation relations between CIs, based on the CI identification information and the CI relation information that are indicated by the configuration information stored in the configuration information storage unit 102 and based on the failure case information stored in the failure case information storage unit 104. In addition, the propagation relation information extraction unit 302 generates message dictionary information based on the log information stored in the log information storage unit 103. It is noted that when a error message itself is stored in the log information stored in the log information storage unit 103, the propagation relation information extraction unit 302 may omit the generation of the message dictionary information.

The classification unit 304 of the abstraction unit 303 classifies each of CIs in the abstraction target system 100 into one of CI types, based on the log information stored in the log information storage unit 103 and the message dictionary information stored in the message dictionary storage unit 106. That is, the classification unit 304 regards that error messages outputted by the CIs of the same type have a commonality, and classifies each of CIs in the abstraction target system 100 into one of CI groups each having the same CI type based on the commonality of the error messages. The classification unit 304 stores a result of classifying the respective CIs into the respective CI types (or CI groups), as CI type information, in the CI type information storage unit 309.

The generation unit 305 of the abstraction unit 303 regards that, for a given pair of CIs corresponding to the same type of propagation relation information, a pair of error messages outputted by the given pair of CIs (at the propagation source and at the propagation destination) have a commonality. Then, on the basis of this commonality of the error messages, the generation unit 305 refers to the propagation relation information storage unit 105 and the message dictionary storage unit 106, and abstracts the propagation relation stored in the propagation relation information storage unit 105. Then, the generation unit 305 stores the abstracted propagation relation in the relation class information storage unit 310 as information on the relation class (hereinafter which will be referred to as relation class information).

Similarly as in the classification unit 304 of the abstraction unit 303, on the basis of the log information stored in the log information storage unit 203, the classification unit 307 of the objectification unit 306 classifies the respective CIs in the objectification target system 200 into the respective CI types on the basis of the commonality of the error messages output by the respective CIs. At this time, the classification unit 307 may classify the respective CIs in the objectification target system 200 into the respective CI types similarly as in the CI type information stored in the CI type information storage unit 309. The classification unit 307 outputs, to the application unit 308, the result of classifying the respective CIs in the objectification target system 200 into the respective CI types.

The application unit 308 refers to the respective CI types in the objectification target system 200, the message dictionary information stored in the message dictionary storage unit 206, and the relation class information stored in the relation class information storage unit 310. Then, the application unit 308 generates the propagation relation information in the objectification target system 200 by applying the relation class information indicating the abstracted propagation relation information to the respective CI types (or CI groups) in the objectification target system 200.

The application unit 308 causes the respective CI types in the objectification target system 200 and the respective pieces of CI relation information obtained by diverting and employing the propagation relation information in the objectification target system 200, to be reflected in the configuration information storage unit 202. Also, the objectification target system 200 may be provided with a propagation relation information storage unit that stores the propagation relation information of the objectification target system 200 obtained by diverting and employing the propagation relation information in the objectification target system 200.

The propagation relation information extraction unit 302 of the control unit 301, the classification unit 304 and the generation unit 305 of the abstraction unit 303, and the classification unit 307 and the application unit 308 of the objectification unit 306, according to the second embodiment, may be implemented, for example, by an integrated circuit such as the ASIC, the CPU, or the MPU. Also, the CI type information storage unit 309 and the relation class information storage unit 310 may be implemented, for example, by a storage apparatus using the RAM, the flash memory, the magnetic disc, the optical disc, or the opto-magnetic disc as the storage medium.

(Configuration Information of Abstraction Target System)

FIG. 3A is a diagram illustrating an example of configuration information of an abstraction target system, according to an embodiment. Configuration information 102a of the abstraction target system 100 is managed by the configuration information storage unit 102. The example of FIG. 3A illustrates the configuration information 102a that is described in a tagged language. In the example of FIG. 3A, the configuration information is described between a [<Graph>] tag and a [</Graph>] tag. Also, the CI identification information is described for each CI, between a [<CISet>] tag and an [</CISet>] tag. In the configuration information 102a of FIG. 3A, the respective CIs are described using CI identification information, that is, using CI ids (identifiers): "CI_a", . . . , "CI_d".

Also, according to the example of FIG. 3A, in the configuration information 102a, the respective pieces of CI relation information are described between a [<RelSet>] tag and a [</RelSet>] tag. According to the example of FIG. 3A, the respective pieces of CI relation information are described using Relation ids (identifiers): "r1" and "r2". The CI relation information of "r1" indicates that "src" (source) representing a CI at the connection source is "CI_a" and "dst" (destination) representing a CI at the connection destination is "CI_b". This indicates that the CI of "CI_b" is connected to the CI of "CI_a" as the connection source. Similarly, the CI relation information of "r2" indicates that "src" is "CI_b" and "dst" is "CI_c".

(Log Information of Abstraction Target System)

FIG. 3B is a diagram illustrating an example of log information of an abstraction target system, according to an embodiment. Log information 103a of the abstraction target system 100 is stored in the log information storage unit 103. According to the example of FIG. 3B, the log information 103a is described in a CSV (Comma Separated Values) format. According to the example of FIG. 3B, the log information 103a stores information item "date" indicating the date (or time and date) when the error message is outputted, information item "CI" indicating the CI at the output source of the error message, and information item "(msgID) msg" indicating identification information identifying an error message and the error message itself, in association with each other. According to the example of FIG. 3B, in the log information 103a, for example, date "t01", CI "CI_a", and (msgID)msg "(01) Can't read record in system table." constitute one entry of the log information.

(Failure Case Information in Abstraction Target System)

FIG. 3C is a diagram illustrating an example of failure case information in an abstraction target system, according to an embodiment. Failure case information 104a in the abstraction target system 100 is stored in the failure case information storage unit 104. The failure case information stores information item "failure" identifying a failure and the contents of the failure, information item "start time" indicating a time when the failure occurs, and information item "recovery time" indicating a time when the failure is recovered, in association with each other. According to the example of FIG. 3C, in the failure case information 104a, for example, failure "HDD failure 01", occurrence time "2010/07/12 03:30:00", and recovery time "2010/07/12 03:35:25" constitute one entry of the failure case information.

(Propagation Relation Information in Abstraction Target System)

FIG. 3D is a diagram illustrating an example of propagation relation information in an abstraction target system, according to an embodiment. Propagation relation information 105a of the abstraction target system 100 stores information item "ID" indicating information identifying the respective propagation relations, information item "propagation source failure" indicating the error message or the like that is outputted by the CI at the propagation source, and information item "propagation destination failure" indicating the error message or the like that is outputted by the CI at the propagation destination, in association with each other. Information item "propagation source failure" further includes information item "CI" indicating the information identifying the CI at the propagation source and information item "msg" indicating the error message outputted by the CI at the propagation source. Similarly, information item "propagation destination failure" includes information "CI" indicating the information identifying the CI at the propagation destination and information item "msg" indicating the error message outputted by the CI at the propagation destination.

According to the example of FIG. 3D, in the propagation relation information 105a, for example, a first entry includes the ID "r1", the propagation source failure where CI is "CI_a"

and msg is "msg1", and the propagation destination failure where CI is "CI_b" and msg is "msg2", in association with each other.

(Message Dictionary Information of Abstraction Target System)

FIG. 3E is a diagram illustrating an example of message dictionary information of an abstraction target system, according to an embodiment. Message dictionary information 106a in the abstraction target system 100 stores information item "msgID" indicating the information identifying the respective error messages (msg) and information item "msg" (error message) corresponding to the respective "msgID", in association with each other. According to the example of FIG. 3E, in the message dictionary information 106a, for example, msgID "01" and msg "Can't read record in system table." constitute one entry of the message dictionary information.

(Error Message Information Organized by CI in Abstraction Target System)

FIG. 3F is a diagram illustrating an example of CI error message information of an abstraction target system, according to an embodiment. Error message information 103b that is organized by CI in the abstraction target system 100 (hereinafter which will be referred to as "CI error message information") is information obtained, by the classification unit 304, by organizing the error messages of the log information 103a stored in the log information storage unit 103 by CI. The CI error message information 103b is information used for the generation unit 305 to generate relation class information 310a. The CI error message information 103b is outputted from the classification unit 304 to the generation unit 305 and temporarily stored in the generation unit 305.

(Configuration Information of Objectification Target System)

FIG. 4A is a diagram illustrating an example of configuration information of an objectification target system, according to an embodiment. Configuration information 202a of the objectification target system 200 is managed by the configuration information storage unit 202. According to the example of FIG. 4A, the configuration information 202a is described in a tagged language. In the example of FIG. 4A, the configuration information is described between the [<Graph>] tag and the [</Graph>] tag. In the configuration information 202a of FIG. 4A, the respective CIs are described using CI identification information, that is, using CI identification information "ids (identifiers)": "CI_1", "CI_2", "CI_3", and "CI_4".

(Log Information of Objectification Target System)

FIG. 4B is a diagram illustrating an example of log information of an objectification target system, according to an embodiment. Log information 203a of the objectification target system 200 is stored in the log information storage unit 203. According to the example of FIG. 4B, the log information 203a is described in the CSV format. The log information 203a of FIG. 4B stores information item "date" indicating the date (or time and date) when the error message is outputted, information item "CI" indicating the CI at the output source of the error message, and information item "(msgID) msg" indicating identification information identifying an error message and the error message itself, in association with each other. According to the example of FIG. 4B, in the log information 203a, for example, date "t11", CI "CI_4", and (msgID) msg "(01) Can't read record in system . . . " constitute one entry of the log information.

(Message Dictionary Information of Objectification Target System)

FIG. 4C is a diagram illustrating an example of message dictionary information of an objectification target system, according to an embodiment. Message dictionary information 206a in the objectification target system 200 stores information item "msgID" indicating the information identifying the respective error messages (msg) and information item "msg" (error message) indicating an error message identified by the "msgID", in association with each other. According to the example of FIG. 4C, in the message dictionary information 206a, for example, msgID "01" and msg "Can't read record in system table" constitute one entry of the message dictionary information.

(Error Message Information Organized by CI in Objectification Target System)

FIG. 4D is a diagram illustrating an example of CI error message information of an objectification target system, according to an embodiment. CI error message information means error message information that is organized by CI in the objectification target system 200, and obtained, by the classification unit 307 of the objectification unit 306 in the management apparatus 300, by organizing error messages of the log information 203a stored in the log information storage unit 203 by CI. The CI error message information 203b is used for the application unit 308 to apply the relation class information 310a to the objectification target system 200. The CI error message information 203b is outputted from the classification unit 307 to the application unit 308 and temporarily stored in the application unit 308.

(CI Type Information)

FIG. 5A is a diagram illustrating an example of CI type information, according to an embodiment. CI type information 309a stores information item "CI type" indicating a group of CIs classified on the basis of the commonality of the error messages, and information item "(msgID) msg" indicating identification information identifying an error message that is outputted by the CI classified into a CI type identified by "CI type" and the error message itself that is identified by the "(msgID)", in association with each other.

According to the example of FIG. 5A, the CI type information 309a indicates that the CIs outputting the error messages "Can't read record in system table." identified by "(01)" and "Can't find record in xx yy zz." are classified into CI type "type1". Similarly, the CI type information 309a indicates that the CIs outputting the error messages of (msgID) msg "(02) ERROR: [YYY] aaa bbb ccc." identified by "(02)" and "An exception or error occurred." identified by "(05)" are classified into CI type "type2". Similarly, the CI type information 309a indicates that the CIs outputting the error messages "(03) GET/HTTP/1.0" 503 XXX" identified by "(03)", "Execution delay: 900 ms" identified by "(06)", and "Number of packets over the threshold." identified by "(07)" are classified into CI type "type3".

(Relation Class Information)

FIG. 5B is a diagram illustrating an example of relation class information, according to an embodiment. The relation class information 310a stores information item "ID" indicating information identifying the respective abstracted propagation relations, information item "propagation source failure" indicating the error message or the like that is outputted from the CI type at the propagation source, and information item "propagation destination failure" indicating the error message or the like that is outputted from the CI type at the propagation destination, in association with each other. The information item "propagation source failure" includes information item "CI type" indicating information identifying the CI type of a CI at the propagation source and information item "msg" indicating an error message outputted by the CI at the propagation source. Similarly, the information item "propagation destination failure" includes information item "CI type" indicating information identifying the CI type of a CI at the propagation destination and information item "msg" indicating the error message outputted by the CI at the propagation destination.

According to the example of FIG. 5B, in the relation class information 310a, a first entry stores ID "C1", the "propagation source failure" where "CI type" is "type1" and "msg" is "Can't read record in system table.", and the "propagation destination failure" where "CI type" is "type2" and "msg" is "ERROR: [YYY] aaa bbb ccc.", in association with each other.

(Process of CI Abstraction and Propagation Relation Abstraction)

Figure 6:
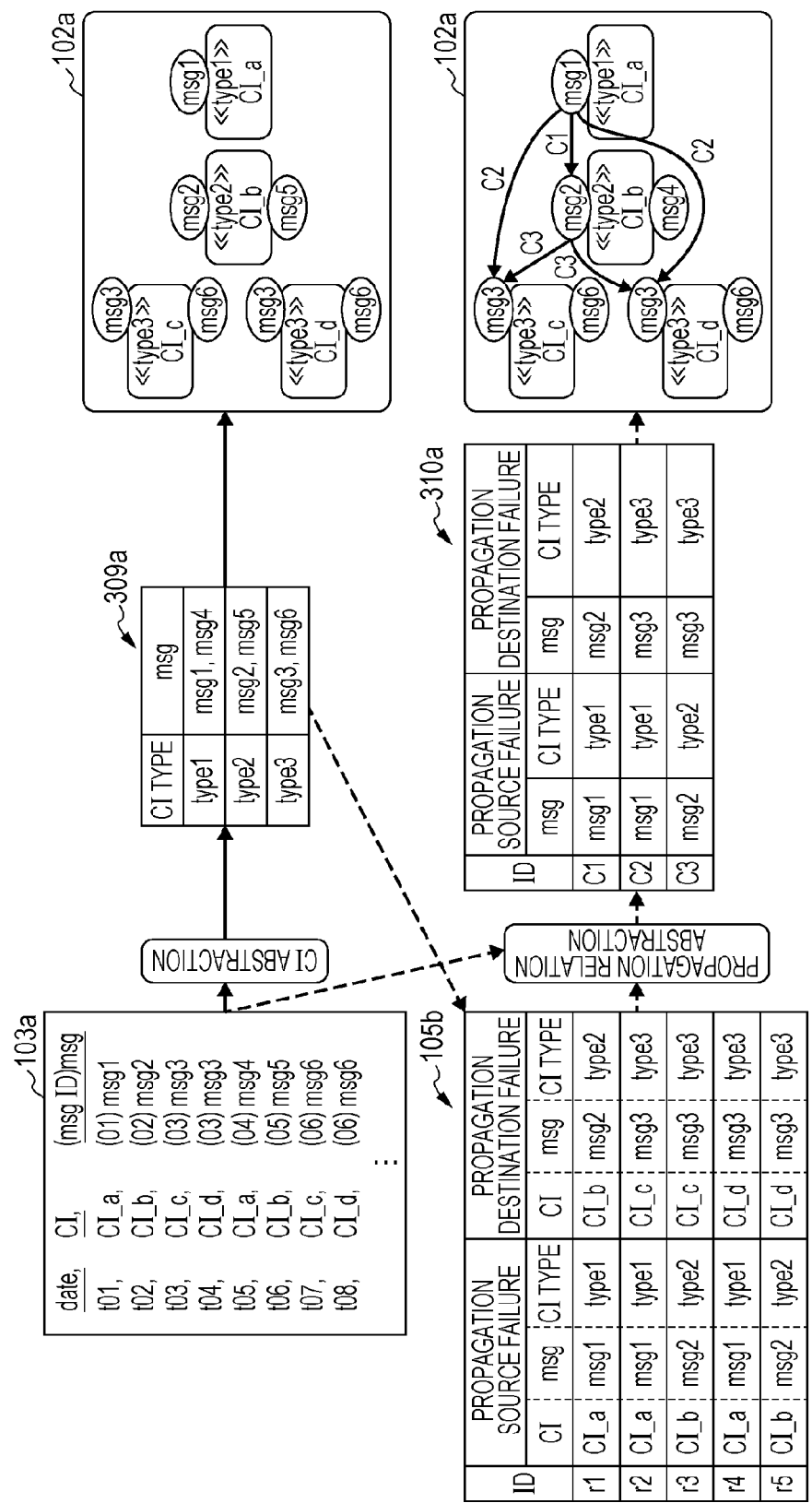
FIG. 6 is a diagram illustrating a processing example of CI abstraction and propagation relation abstraction, according to an embodiment.

FIG. 6 is a diagram illustrating a processing example of CI abstraction and propagation relation abstraction, according to an embodiment. The log information 103a of the abstraction target system 100 illustrated in FIG. 6 indicates that CI "CI_a" outputs (msgID)msg "(01) msg1" on date "t01". Similarly, the log information 103a indicates that CI "CI_b" outputs (msgID)msg "(02) msg2" on date "t02". Similarly, the log information 103a indicates that CI "CI_c" outputs (msgID)msg "(03) msg3" on date "t03".

Similarly, the log information 103a indicates that CI "CI_d" outputs (msgID)msg "(3) msg3" on date "t04". Similarly, the log information 103a indicates that CI "CI_a" outputs (msgID)msg "(04) msg4" on date "t05".

Similarly, the log information 103a indicates that CI "CI_b" outputs (msgID)msg "(05) msg5" on date "t06". Similarly, the log information 103a indicates that CI "CI_c" outputs (msgID)msg "(06) msg6" on date "t07". Similarly, the log information 103a indicates that CI "CI_d" outputs (msgID)msg "(06) msg6" on date "t08".

The classification unit 304 of the abstraction unit 303 in the management apparatus 300 refers to the log information 103a and performs the abstraction of CIs by classifying each of the CIs into one of CI types based on error message outputted by the each CI. For example, the classification unit 304 classifies CI "CI_a" that outputs "msg1" and "msg4" into the CI type of "type1". Similarly, the classification unit 304 classifies CI "CI_b" that outputs "msg2" and "msg5" into the CI type of "type2". Further, the classification unit 304 classifies CI "CI_c" and "CI_d" that output "msg3" and "msg6" into the same CI type of "type3" because the CI "CI_c" and "CI_d" output the same error messages. The classification unit 304 stores the result of the classifying the respective CIs into the CI types (CI groups), as depicted in the CI type information 309a, in the CI type information storage unit 309.

When the result of the abstraction of the respective CIs is reflected on the configuration information 102a by the classification unit 304, "CI_a" that outputs "msg1" is abstracted into "type1". Similarly, "CI_b" that outputs "msg2" and "msg5" is abstracted into "type2", and "CI_c" and "CI_d" that output "msg3" and "msg6" are abstracted into "type3".

In addition, the propagation relation information 105b of FIG. 6 indicates information in which on the basis of the CI type information 309a, the CI types into which the respective CIs are classified are associated with the respective CIs indicated by the propagation relation information 105a of FIG. 3D. In the propagation relation information 105b illustrated in FIG. 6, the propagation relation information of ID "r1" indicates propagation relation information where CI "CI_a", msg "msg1", and CI type "type1" are set for the "propagation source failure" and CI "CI_b", msg "msg2", and CI type "type2" are set for the "propagation destination failure".

Similarly, in the propagation relation information 105b illustrated in FIG. 6, the propagation relation information of ID "r2" indicates propagation relation information where CI "CI_a", msg "msg1", and CI type "type1" are set for the "propagation source failure" and CI "CI_c", msg "msg3", CI type "type3" are set for the "propagation destination failure". Similarly, in the propagation relation information 105b illustrated in FIG. 6, the propagation relation information of ID "r3" indicates propagation relation information where CI "CI_b", msg "msg2", and CI type "type2" are set for the "propagation source failure", and CI "CI_c", msg "msg3", and CI type "type3" are set for the "propagation destination failure".

Similarly, in the propagation relation information 105b illustrated in FIG. 6, the propagation relation information of ID "r4" indicates propagation relation information where CI "CI_a", msg "msg1", and CI type "type1" are set for the "propagation source failure" and CI "CI_d", msg "msg3", and CI type "type3" are set for the "propagation destination failure". Further, in the propagation relation information 105b illustrated in FIG. 6, the propagation relation information of ID "r5" indicates propagation relation information where CI "CI_b", msg "msg2", and CI type "type2" are set for the "propagation source failure" and CI "CI_d", msg "msg3", and CI type "type3" are set for the "propagation destination failure".

When the result of the abstraction of the respective propagation relations is reflected on the configuration information 102a by the generation unit 305, as illustrated in FIG. 6, it is found out from the propagation relation information of the "C1" that the output of "msg1" by "CI_a" of "type1" is propagated to the output of "msg2" by "CI_b" of "type2". Similarly, as illustrated in FIG. 6, it is found out from the propagation relation information of "C2" that the output of "msg1" by "CI_a" of "type1" is propagated to the output of "msg3" by "CI_c" and "CI_d" of "type3". Similarly, as illustrated in FIG. 6, it is found out from the propagation relation information of "C3" that the output of "msg2" by "CI_b" of "type2" is propagated to the output of "msg3" by "CI_c" and "CI_d" of "type3".

The generation unit 305 of the abstraction unit 303 refers to the propagation relation information 105b and summarizes the respective pieces of propagation relation information in terms of the CI type and the error message so as to carry out the abstraction of the propagation relation. For an example, in the propagation relation information 105b, the generation unit 305 summarizes the entries where information items "msg" and "CI type" in the propagation source failure and information items "msg" and "CI type" in the propagation destination failure are all matched into a class.

That is, from the propagation relation information 105b, the generation unit 305 generates, as relation class information, an entry of ID "C1" in which msg "msg1" and CI type "type1" are set for the "propagation source failure", and msg "msg2" and CI type "type2" are set for the "propagation destination failure". Similarly, from the propagation relation information 105b, the generation unit 305 generates, as relation class information, an entry of ID "C2" in which msg "msg1" and CI type "type1" are set for the "propagation source failure", and msg "msg3" and CI type "type3" are set for the "propagation destination failure". Similarly, from the propagation relation information 105b, the generation unit 305 generates, as relation class information, an entry of ID "C3" in which msg "msg2" and CI type "type2" are set for the "propagation source failure", and msg "msg3" and CI type "type3" are set for the "propagation destination failure".

That is, in FIG. 6, the generation unit 305 abstracts the propagation relation information of ID "r1" in the propagation relation information 105b into the relation class information of ID "C1" in the relation class information 310a. Also, the generation unit 305 integrates the propagation relation information of ID "r2" and "r4" in the propagation relation information 105b into the relation class information of ID "C2" in the relation class information 310a since the error messages at the propagation source and the propagation destination are identical to each other. Further, the generation unit 305 integrates the propagation relation information of ID "r3" and "r5" in the propagation relation information 105b into the relation class information of ID "C3" in the relation class information 310a since the error messages at the propagation source and the propagation destination are identical to each other.

(Process of CI Objectification and Propagation Relation Objectification)

FIG. 7 is a diagram illustrating a processing example of a CI objectification and a propagation relation objectification, according to an embodiment. The log information 203a of the objectification target system 200 illustrated in FIG. 7 indicates that CI "CI_4" outputs (msgID)msg "(01)msg1" on date "t11". Similarly, the log information 203a indicates that CI "CI_3" outputs (msgID)msg "(02) msg2" on date "t12". Similarly, the log information 203a indicates that CI "CI_4" outputs (msgID)msg "(04) msg4" on date "t13".

Similarly, the log information 203a indicates that CI "CI_1" outputs (msgID)msg "(03) msg3" on date "t14". Similarly, the log information 203a indicates that CI "CI_3" outputs (msgID)msg "(05) msg5" on date "t15".

Similarly, the log information 203a indicates that CI "CI_1" outputs (msgID)msg "(06) msg6" on date "t16". Similarly, the log information 203a indicates that CI "CI_2" outputs (msgID)msg "(03) msg3" on date "t17". Similarly, the log information 203a indicates that CI "CI_2" outputs (msgID)msg "(06) msg6" on date "t18".

The classification unit 307 of the objectification unit 306 in the management apparatus 300 refers to the configuration information 202a, the log information 203a, and the CI type information 309a, of the objectification target system 200, and performs CI objectification by identifying the CI type of a CI that outputted an error message on the basis of the log information 203a. For example, the classification unit 307 determines that CI "CI_4" that outputted "msg1" and "msg4" has a CI type of "type1". Similarly, the classification unit 307 determines that CI "CI_3" that outputted "msg2" and "msg5" has a CI type of "type2". Further, the classification unit 307 determines that CIs "CI_1" and "CI_2" that outputted "msg3" and "msg6" have a CI type of "type3". The classification unit 307 reflects the determined (or objectified) CI types of the respective CIs on the configuration information 202a.

When the determined CI types of the respective CIs reflected on the configuration information 202a by the classification unit 307, "CI_4" that outputted "msg1" and "msg4" is objectified into "type1", "CI_3" that outputted "msg2" and "msg5" is objectified into "type2", and "CI_1" and "CI_2" that outputted "msg3" and "msg6" are objectified into "type3", as depicted in 202a of FIG. 7.

The application unit 308 of the objectification unit 306 objectifies the propagation relation between the respective CIs where the CI type is identified by the classification unit 307, based on the configuration information 202a, the log information 203a, and the relation class information 310a, of the objectification target system 200. For example, when a reference is made on the relation class information 310a, the propagation relation indicated by ID "C1" is estimated between CI "CI_4" that outputted "msg1" of CI type "type1" and CI "CI_3" that outputted "msg2" of CI type "type2".

Similarly, when a reference is made on the relation class information 310a, the propagation relation indicated by ID "C2" is estimated between CI "CI_4" that outputted "msg1" of CI type "type1" and CI "CI_1" that outputted "msg3" of CI type "type3". Similarly, when a reference is made on the relation class information 310a, the propagation relation indicated by ID "C2" is estimated between CI "CI_1" that outputted "msg1" of CI type "type1" and CI "CI_2" that outputted "msg3" of CI type "type3".

Similarly, when a reference is made on the relation class information 310a, the propagation relation indicated by ID "C3" is estimated between CI "CI_3" that outputted "msg2" of CI type "type2" and CI "CI_1" that outputted "msg3" of CI type "type3". Similarly, when a reference is made on the relation class information 310a, the propagation relation indicated by ID "C3" is estimated between CI "CI_3" that outputted "msg2" of CI type "type2" and CI "CI_2" that outputted "msg3" of CI type "type3". In this manner, the application unit 308 applies the propagation relation indicated by the relation class information 310a to the result of the identifying the CI type based on the error message, and estimates propagation relations in the objectification target system 200 so as to objectify the propagation relations.

When the result of the objectification of the respective propagation relations is reflected on the configuration information 202a by the application unit 308, as illustrated in FIG. 7, it is found out from the propagation relation information of "C1" that the output of "msg1" by "CI_4" of "type1" is propagated to the output of "msg2" by "CI_3" of "type2". Similarly, as illustrated in FIG. 7, it is found out from the propagation relation information of "C2" that the output of "msg1" by "CI_4" of "type1" is propagated to the output of "msg3" by "CI_1" and "CI_2" of "type3". Similarly, as illustrated in FIG. 7, it is found out from the propagation relation information of "C3" that the output of "msg2" by "CI_3" of "type2" is propagated to the output of "msg3" by "CI_1" and "CI_2" of "type3".

(Configuration Information on which Propagation Relation Information is Reflected)

FIG. 8 is a diagram illustrating an example of configuration information of an objectification target system on which propagation relation information is reflected, according to an embodiment. The propagation relation is objectified through the processing performed by the objectification unit 306 in the management apparatus 300, for example, as illustrated in the configuration information 202a of FIG. 8. In the configuration information 202a, between the [<CISet>] tag and the [</CISet>] tag of, a CI type is added as information on "type" in addition to a piece of CI identification information, for each CI. For example, for CI id "CI_1", CI type "type3" is added. For CI id "CI_2", CI type "type3" is added. For CI id "CI_3", CI type "type2" is added. For CI id "CI_4", CI type "type1" is added.

According to the example of FIG. 8, the CI relation information is further added which is described between the [<RelSet>] tag and the [</RelSet>] tag of the configuration information 202a. In the example of FIG. 8, definitions of the respective pieces of CI relation information identified by "Relation ids (identifiers)" including "r1" to "r5" are added. According to the example illustrated in FIG. 8, CI relation information of "r1" indicates that "src" indicating a CI at the connection source is "CI_4", "dst" indicating a CI at the connection destination is "CI_3", and "class" indicating the relation class in the relation class information 310a is "C1". Similarly, CI relation information of "r2" indicates that "src" indicating a CI at the connection source is "CI_4", "dst"

indicating a CI at the connection destination is "CI__1", and "class" indicating the relation class is "C2".

Similarly, according to the example illustrated in FIG. 8, CI relation information of "r3" indicates that "src" indicating a CI at the connection source is "CI__4", "dst" indicating a CI at the connection destination is "CI__2", and "class" indicating the relation class is "C2". Similarly, CI relation information of "r4" indicates that "src" indicating a CI at the connection source is "CI__3", "dst" indicating a CI at the connection destination is "CI__1", and "class" indicating the relation class is "C3". Similarly, CI relation information of "r5" indicates that "src" indicating a CI at the connection source is "CI__3", "dst" indicating a CI at the connection destination is "CI__2", and "class" indicating the relation class is "C3".

(CI Abstraction Processing)

Figure 9:
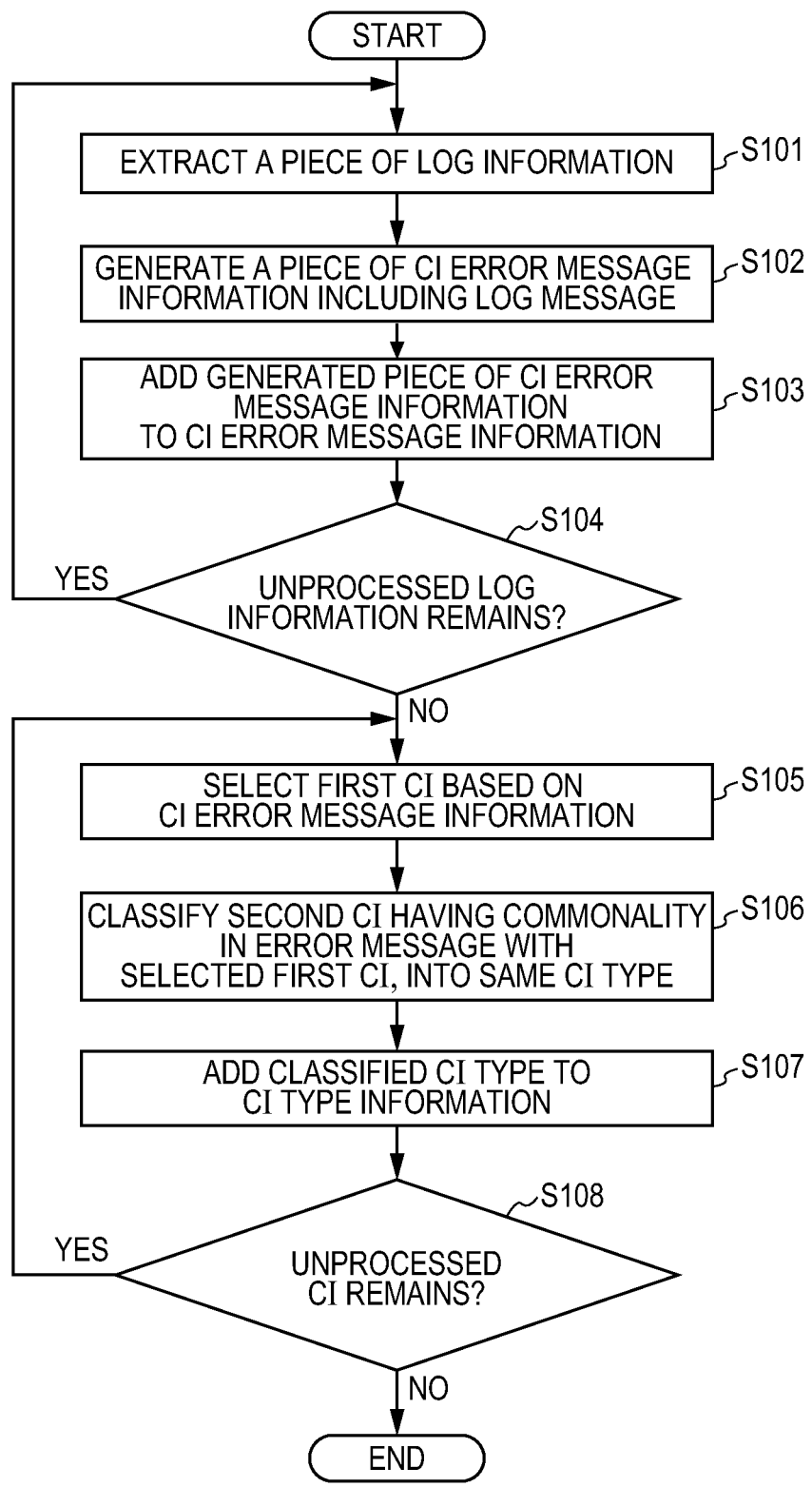
FIG. 9 is a diagram illustrating an example of an operational flowchart for CI abstraction processing, according to an embodiment.

FIG. 9 is a diagram illustrating an example of an operational flowchart for CI abstraction processing, according to an embodiment. The CI abstraction processing may be invoked by an operation of an operator of the management apparatus 300 or at the scheduled execution timing.

In operation S101, the management apparatus 300 extracts a piece of log information from the log information 103a stored in the log information storage unit 103 of the abstraction target system 100.

In operation S102, the management apparatus 300 generates a piece of CI error message information for storing the CI identification information and the message.

In operation S103, the management apparatus 300 stores, in the generated piece of CI error message information, the CI identification information and the message that are stored in the piece of log information extracted in operation S101, and adds the piece of CI error message information to the CI error message information 103b.

In operation S104, the management apparatus 300 determines whether or not the unprocessed log information remains in the log information 103a. When it is determined that the unprocessed log information remains (YES in operation S104), the management apparatus 300 shifts the processing to operation S101, and when it is not determined that the unprocessed log information remains (NO in operation S104), the management apparatus 300 shifts the processing to operation S105.

In operation S105, the management apparatus 300 selects a first CI based on the CI error message information 103b.

In operation S106, the management apparatus 300 classifies a second CI having a commonality in the error message with the first CI selected in operation S105, into the same CI type (CI group) as the first CI.

In operation S107, the management apparatus 300 adds the CI type classified in operation S106 to the CI type information 309a that is stored in the CI type information storage unit 309.

In operation S108, the management apparatus 300 determines whether or not an unprocessed CI remains in the CI error message information 103b. When it is determined that the unprocessed CI remains (YES in operation S108), the management apparatus 300 shifts the processing to operation S105, and when it is not determined that the unprocessed CI remains (NO in operation S108), the management apparatus 300 ends the CI abstraction processing.

(Propagation Relation Abstraction Processing)

Figure 10:
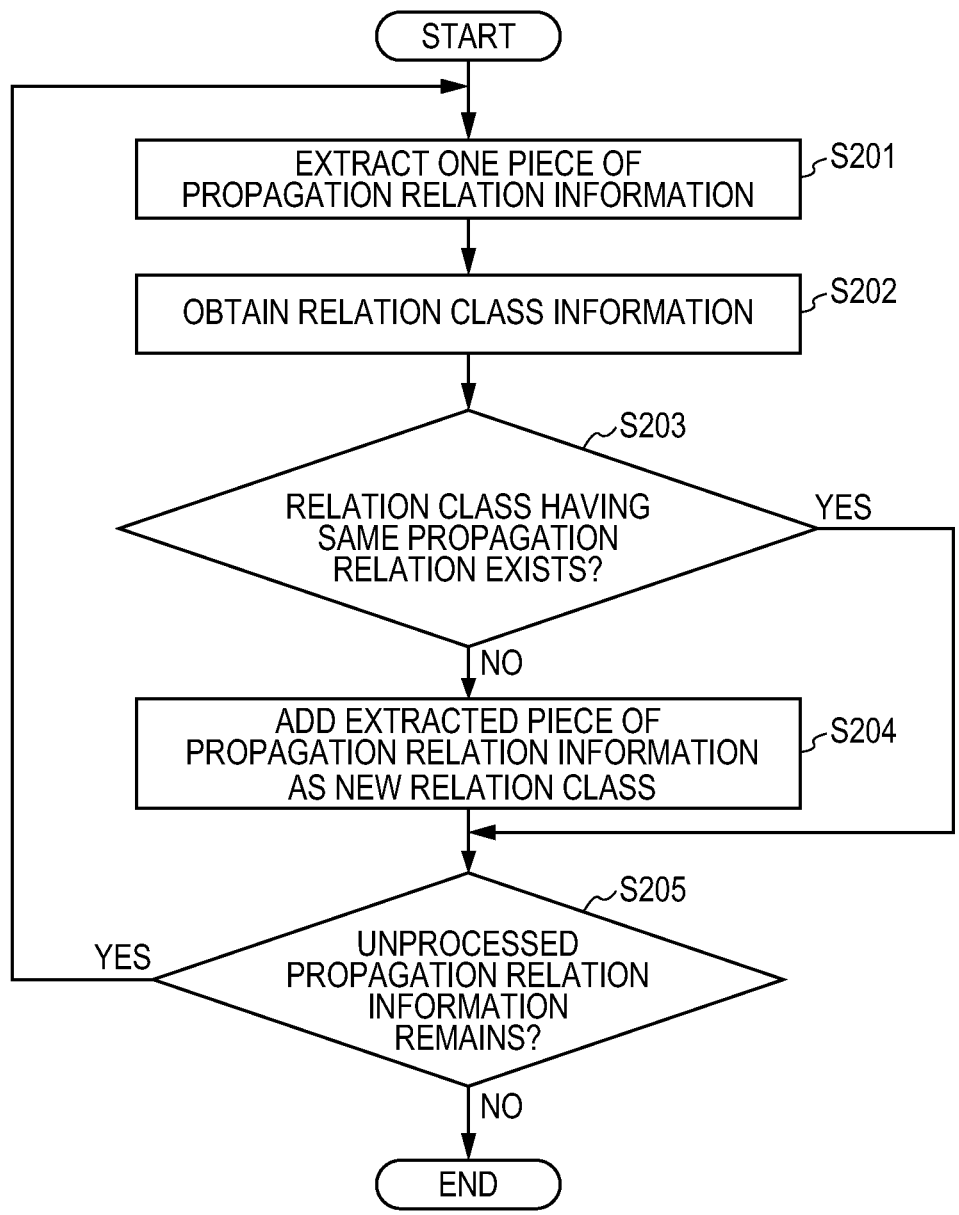
FIG. 10 is a diagram illustrating an example of an operational flowchart for a propagation relation abstraction processing, according to an embodiment.

FIG. 10 is a diagram illustrating an example of an operational flowchart for a propagation relation abstraction processing, according to an embodiment. The propagation relation abstraction processing may be invoked by an operation of an operator of the management apparatus 300 or at the scheduled execution timing. Further, the execution order of the CI abstraction processing illustrated in FIG. 9 and the propagation relation abstraction processing illustrated in FIG. 10 may be arbitrarily changed, and it is also possible to execute the two pieces of processing in parallel.

In operation S201, the management apparatus 300 extracts one piece of propagation relation information from the propagation relation information 105a of the abstraction target system 100.

In operation S202, the management apparatus 300 obtains the relation class information 310a stored in the relation class information storage unit 310.

In operation S203, the management apparatus 300 determines whether or not there exists, in the relation class information 310a, relation class information indicating the same propagation relation as the propagation relation indicated by the piece of propagation relation information extracted in operation S201

When it is determined that there exists in the relation class information 310a the relation class information indicating the same propagation relation as the propagation relation indicated by the piece of propagation relation information extracted in step S201 (YES in operation S203), the management apparatus 300 shifts the processing to operation S205. On the other hand, when it is not determined that there exists in the relation class information 310a no relation class information indicating the same propagation relation as the propagation relation indicated by the piece of propagation relation information extracted in step S201 (NO in operation S203), the management apparatus 300 shifts the processing to operation S204.

In operation S204, the management apparatus 300 adds the piece of propagation relation information extracted from the propagation relation information 105a in operation S201 as new relation class information, to the relation class information 310a that is stored in the relation class information storage unit 310. When operation S204 is ended, the management apparatus 300 shifts the processing to operation S205.

In operation S205, the management apparatus 300 determines whether or not the unprocessed propagation relation information remains in the propagation relation information 105a. When it is determined that the unprocessed propagation relation information remains in the propagation relation information 105a (YES in operation S205), the management apparatus 300 shifts the processing to operation S201. On the other hand, when it is not determined that the unprocessed propagation relation information remains in the propagation relation information 105a (NO in operation S205), the management apparatus 300 ends the propagation relation abstraction processing.

(CI Objectification Processing)

Figure 11:
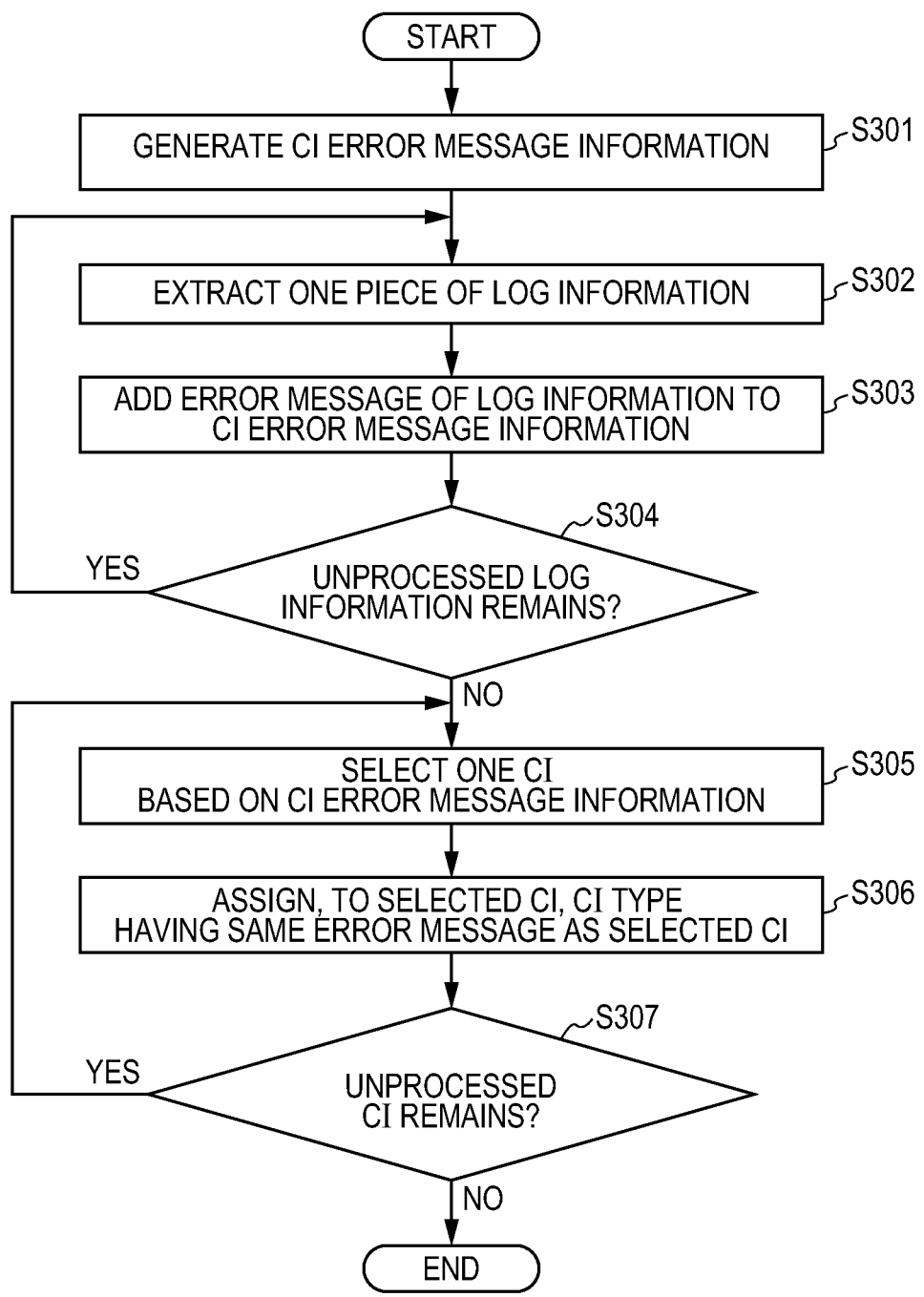
FIG. 11 is a diagram illustrating an example of an operational flowchart for a CI objectification processing, according to an embodiment.

FIG. 11 is a diagram illustrating en example of an operational flowchart for a CI objectification processing, according to an embodiment. The CI objectification processing may be invoked by an operation of an operator of the management apparatus 300 or at the scheduled execution timing.

In operation S301, the management apparatus 300 generates the CI error message information 203b.

In operation S302, the management apparatus 300 extracts one piece of log information 203a from the log information storage unit 203 in the objectification target system 200.

In operation S303, the management apparatus 300 adds the error message included in the piece of log information extracted in operation S302, to the CI error message information 203b.

In operation S304, the management apparatus 300 determines whether or not log information on which the processing of operation S301 is not yet performed remains in the log information 203a. When it is determined that the log information on which the processing of operation S301 is not yet performed remains in the log information 203a (YES in operation S304), the management apparatus 300 shifts the processing to operation S302. On the other hand, when it is not determined that the log information on which the processing of operation S301 is not yet performed remains in the log information 203a (NO in operation S304), the management apparatus 300 shifts the processing to operation S305.

In operation S305, the management apparatus 300 selects a CI and the error message outputted by the CI based on the CI error message information 203b.

In operation S306, the management apparatus 300 assigns, to the CI selected in operation S305, a CI type that is associated with an error message outputted by the selected CI within the CI type information 309a of the CI type information storage unit 309. That is, the management apparatus 300 assigns a CI type having the same message outputted by the selected CI, to the selected CI. In this manner, a CI type is identified on the basis of the error messages.

In operation S307, the management apparatus 300 determines whether or not a CI on which the processing of operation S305 is not yet performed remains in the CI error message information 203b.

When it is determined that a CI on which the processing of operation S305 is not yet performed remains in the CI error message information 203b (YES in operation S307), the management apparatus 300 shifts the processing to operation S305. On the other hand, when it is not determined that a CI on which the processing of operation S305 is not yet performed remains in the CI error message information 203b (NO in operation S307), the management apparatus 300 ends the CI objectification processing.

(Propagation Relation Objectification Processing)

Figure 12:
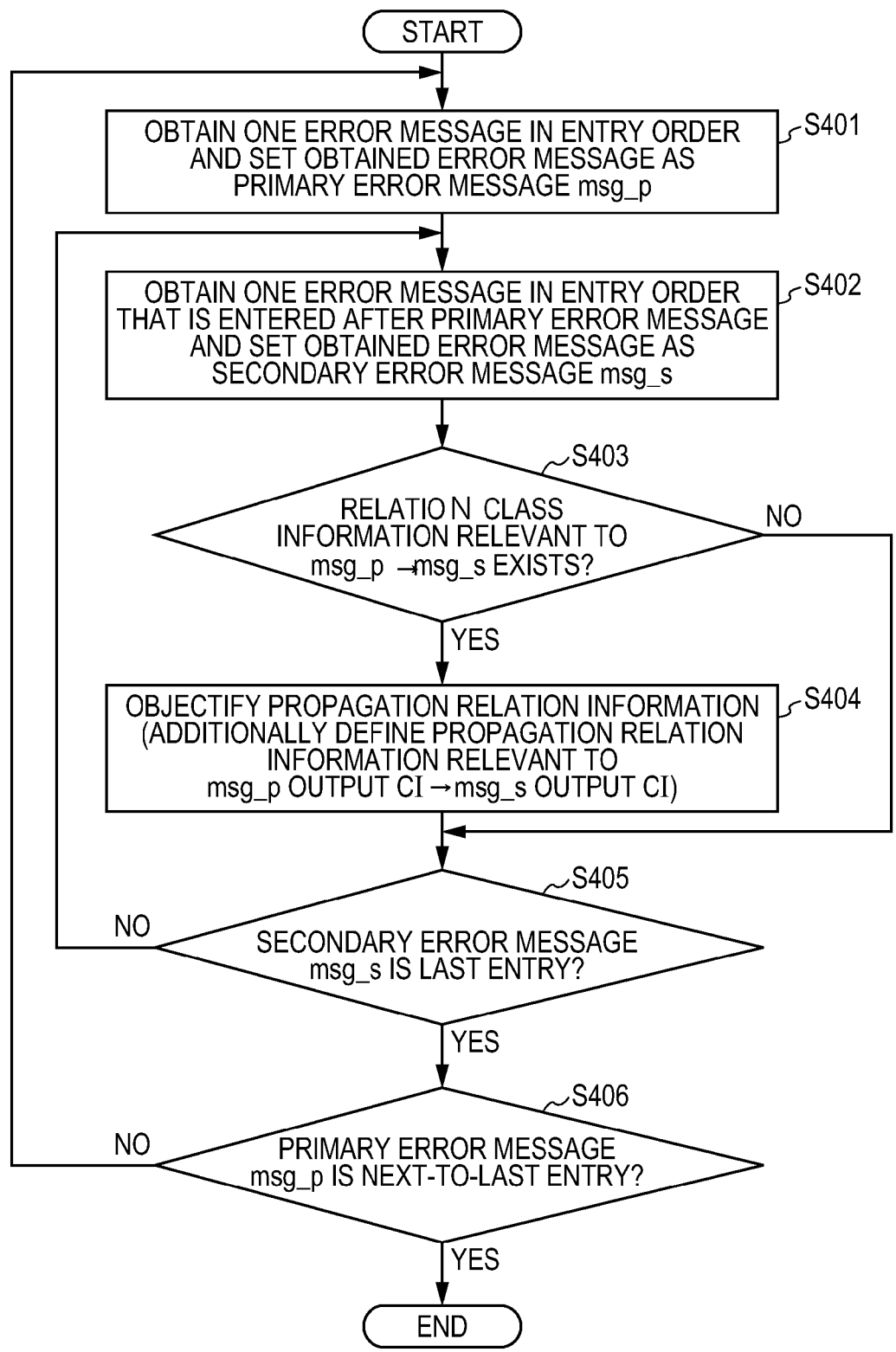
FIG. 12 is a diagram illustrating an example of an operational flowchart for propagation relation objectification processing, according to an embodiment.

FIG. 12 is a diagram illustrating an example of an operational flowchart for propagation relation objectification processing, according to an embodiment. The propagation relation objectification processing may be invoked by an operation of the operator of the management apparatus 300 or at the scheduled execution timing. Further, the execution order of the CI objectification processing illustrated in FIG. 11 and the propagation relation objectification processing illustrated in FIG. 12 may be arbitrarily changed, and it is also possible to execute the two pieces of processing in parallel.

In operation S401, the management apparatus 300 obtains one error message in an entry order from the CI error message information 203b generated through the CI objectification processing illustrated in FIG. 11, and sets the obtained error message as a primary error message msg_p. It is noted that at the time of the initial execution of operation S401, the management apparatus 300 obtains a lead entry of the CI error message information 203b.

In operation S402, the management apparatus 300 obtains one error message, in the entry order, from error messages that were entered in the CI error message information 203b after the primary error message msg_p was entered, and sets the obtained error message as a secondary error message msg_s.

In operation S403, the management apparatus 300 determines whether or not relation class information indicating the propagation relation from the primary error message msg_p to the secondary error message msg_s exists in the relation class information 310a.

When it is determined that the relation class information indicating the propagation relation from the primary error message msg_p to the secondary error message msg_s exists in the relation class information 310a (YES in operation S403), the management apparatus 300 shifts the processing to operation S404. On the other hand, when it is not determined that the relation class information indicating the propagation relation from the primary error message msg_p to the secondary error message msg_s exists in the relation class information 310a (NO in operation S403), the management apparatus 300 shifts the processing to operation S405.

In operation S404, the management apparatus 300 objectifies the propagation relation information in the objectification target system 200, using the relation class information indicating the propagation relation from the primary error message msg_p to the secondary error message msg_s. For example, the management apparatus 300 defines new propagation relation information by adding the relation class information indicating a relation from a first CI type that outputted the primary error message msg_p to a second CI type that outputted the secondary error message msg_s, to the configuration information 202a stored in the configuration information storage unit 202. In this way, it is possible to define the propagation relation information and the CI relation information in the objectification target system 200. When the processing of operation S404 is ended, the management apparatus 300 shifts the processing to operation S405.

In step S405, the management apparatus 300 determines whether or not the secondary error message msg_s obtained in operation S402 is the last entry in the CI error message information 203b. When it is determined that the secondary error message msg_s obtained in operation S402 is the last entry in the CI error message information 203b (YES in operation S405), the management apparatus 300 shifts the processing to operation S406. On the other hand, when it is not determined that the secondary error message msg_s obtained in operation S402 is the last entry in the CI error message information 203b (NO in operation S405), the management apparatus 300 shifts the processing to operation S402.

It is noted that in operation S402 to which the processing is shifted from operation S405 (No in operation S405), the management apparatus 300 obtains an error message on an entry that is positioned next to the error message obtained in the previous time, as the secondary error message msg_s in the CI error message information 203b.

In operation S406, the management apparatus 300 determines whether or not the primary error message msg_p obtained in operation S401 is the next-to-last entry in the CI error message information 203b. When the primary error message msg_p obtained in operation S401 is the next-to-last entry in the CI error message information 203b, the error message obtained in operation S402 as the secondary error message msg_s becomes the last entry. This means that the management apparatus 300 has performed the processing of operation S403 with respect to all combinations of the two entries in the CI error message information 203b, and the existence check of the relation class indicating the relevant propagation relation information is ended. In this way, the management apparatus 300 performs the end determination on the propagation relation objectification processing by determining whether or not the primary error message msg_p obtained in operation S401 is the next-to-last entry in the CI error message information 203b.

When it is determined that the primary error message msg_p obtained in operation S401 is the next-to-last entry in the CI error message information 203b (YES in operation S406), the management apparatus 300 ends the propagation relation objectification processing. On the other hand, when it is not determined that the primary error message msg_p obtained in operation S401 is the next-to-last entry in the CI error message information 203b (NO in operation S406), the management apparatus 300 shifts the processing to operation S401.

It is noted that in operation S401 to which the processing is shifted from operation S406 (No in operation S406), the management apparatus 300 obtains an error message of an entry that is positioned next to the error message obtained in the previous time, as the primary error message msg_p in the CI error message information 203b.

(Effects of Second Embodiment)

By paying attention to the commonality of the error messages outputted by the respective CIs in the abstraction target system 100, the management apparatus 300 generates CI type information 309a in which CIs that outputted the error messages having the commonality are classified into the same CI type. Then, the management apparatus 300 generates relation classes indicating information on propagation relations of error messages between CI types, based on the CI type information 309a and the propagation relation information of the error messages outputted by the respective CIs in the abstraction target system 100.

Also, the management apparatus 300 classifies each of the CIs in the objectification target system 200 into one of CI types that is associated, in the CI type information 309a, with an error message outputted by the each CI. Then, the management apparatus 300 applies the generated relation class indicating information on propagation relations of the error messages between CI types, to the result of classifying the CIs of the objectification target system 200 into the respective CI types.

In this way, since the propagation relation information between the respective CIs is abstracted from the abstraction target system 100 and applied to the objectification target system 200, it is possible to define the cause-effect relation between the respective CIs in the objectification target system 200 by diverting and employing the information obtained from the abstraction target system 100. That is, even in a case where the respective pieces of CI information and the respective pieces of CI relation information are not sufficient in the objectification target system 200, the respective pieces of CI relation information and the propagation relation information of the error messages may be defined by diverting and employing the propagation relation information of the error messages between the respective CIs which has been accumulated in the abstraction target system 100. Thus, since the system operational know-how is diverted and employed and reutilized between different systems, it is possible to carry out the prompt failure response. As a result, a cost of the system may be reduced in some cases.

(Management Program)

The various pieces of processing described in the above-mentioned embodiments may be carried out, by a computer, by executing programs that are prepared in advance.

Figure 13:
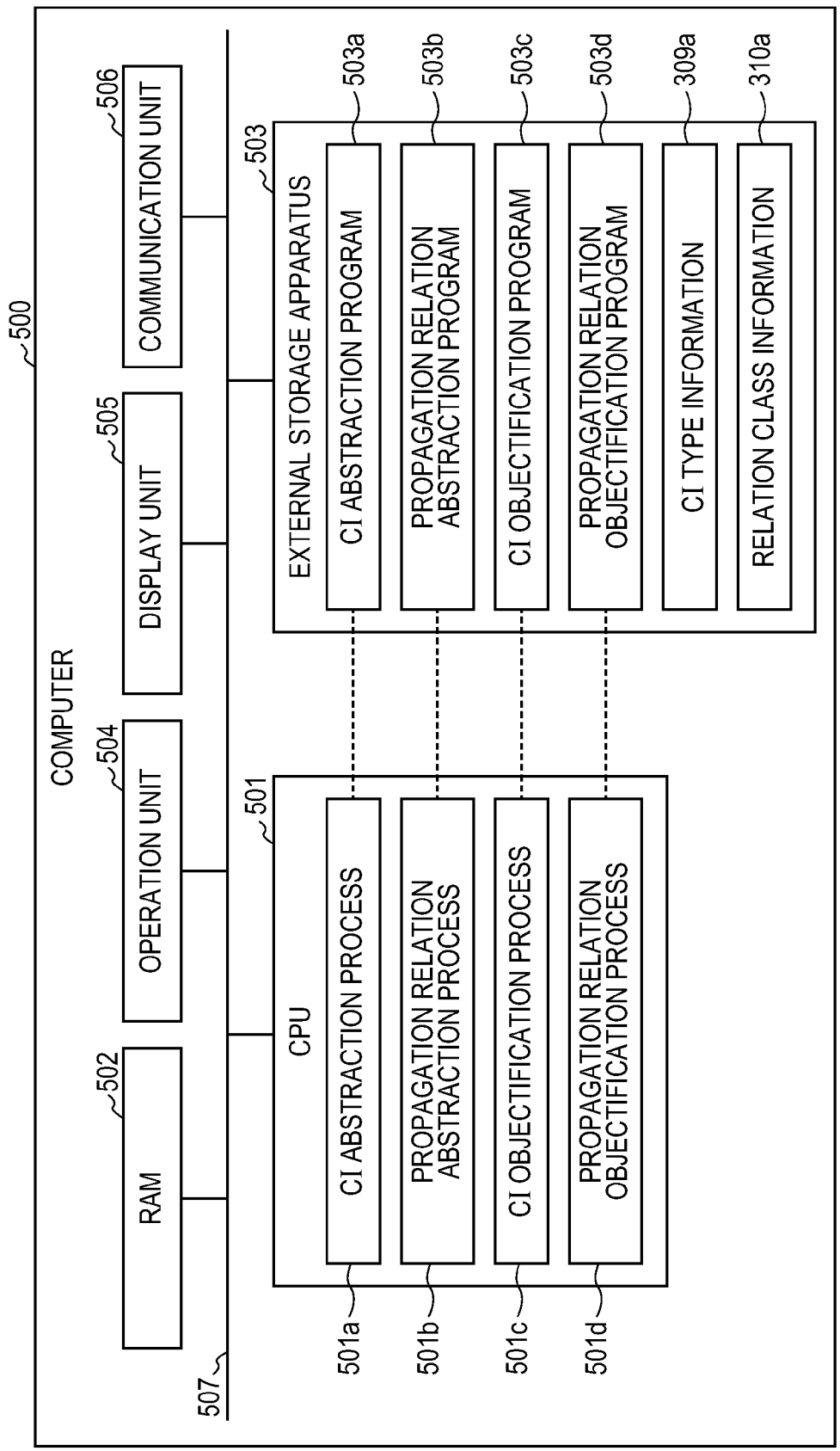
FIG. 13 is a diagram illustrating an example of a computer that executes programs, according to an embodiment.

FIG. 13 is a diagram illustrating an example of a computer that executes programs, according to an embodiment. FIG. 13 illustrates an example in which the various pieces of processing described in the above-mentioned embodiments are executed using management programs.

As illustrated in FIG. 13, a computer 500 may be configured to include a CPU 501, a RAM 502, an external storage apparatus 503, an operation unit 504 that accepts an operation by the operator, a display unit 505 that displays information related to the executions of the various pieces of processing, and a communication unit 506, where the above mentioned units are connected via a bus 507.

The external storage apparatus 503 beforehand stores management programs for exerting functions similar to the abstraction unit 303 and the objectification unit 306 illustrated in FIG. 2, and various pieces of data used for the execution of the management programs. The management programs include a CI abstraction program 503a for causing the computer 500 to execute the CI abstraction processing illustrated in FIG. 9. Also, the management programs include a propagation relation abstraction program 503b for causing the computer 500 to execute the propagation relation abstraction processing illustrated in FIG. 10.

Further, the management programs include a CI objectification program 503c for causing the computer 500 to execute the CI objectification processing illustrated in FIG. 11. Furthermore, the management programs include a propagation relation objectification program 503d for causing the computer 500 to execute the propagation relation objectification processing illustrated in FIG. 12. Here, similarly as in the respective units depicted in FIG. 2, the management programs may be appropriately integrated or separated.

Also, the various pieces of data used for the executions of the management programs include the CI type information 309a illustrated in FIG. 5A and the relation class information 310a illustrated in FIG. 5B.

As illustrated in FIG. 13, the CPU 501 reads out respective programs 503a to 503d from the external storage apparatus 503, and executes the respective programs. With this configuration, the CI abstraction program 503a is executed as a CI abstraction process 501a. Also, the propagation relation abstraction program 503b is executed as a propagation relation abstraction process 501b. Also, the CI objectification program 503c is executed as a CI objectification process 501c. Also, the propagation relation objectification program 503d is executed as a propagation relation objectification process 501d.

The CI abstraction process 501a includes processing executed by the classification unit 304 of the abstraction unit 303 illustrated in FIG. 2, for example, the CI abstraction processing illustrated in FIG. 9. Also, the propagation relation abstraction process 501b includes processing executed by the generation unit 305 of the abstraction unit 303 illustrated in FIG. 2, for example, the propagation relation abstraction processing illustrated in FIG. 10. Also, the CI objectification process 501c includes processing executed by the classification unit 307 of the objectification unit 306 illustrated in FIG. 2, for example, the CI objectification processing illustrated in FIG. 11. Also, the propagation relation objectification process 501d includes processing executed by the application unit 308 of the objectification unit 306 illustrated in FIG. 2, for example, the propagation relation objectification processing illustrated in FIG. 11.

The respective units that are illustrated in FIG. 2 and to be realized by executing the respective programs 503a to 503d using the CPU 501, the RAM 502, and the external storage apparatus 503 may be appropriately implemented at the time of executing the processing. Also, it is not necessarily the case that the respective programs 503a to 503d are beforehand stored in the external storage apparatus 503. For example, the respective programs may be stored in a portable physical medium which may be read by the computer 500, such as a portable magnetic disk, an optical disk, a magnet-optical disk, or a card on which an integrated circuit is mounted. Then, the computer 500 may read out the respective programs from the portable physical medium via a medium reading apparatus, to execute the respective programs. In addition, it is also possible to execute programs by obtaining the programs from another computer that is communicable with the computer 500 via the communication unit 506 through a public line network or a closed line network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for managing systems each including a plurality of configuration items, the apparatus comprising:
   a processor to:
      generate configuration group information by classifying a first plurality of configuration items of a first system into first configuration groups each including one or more configuration items that have outputted messages having a commonality, based on first log information storing messages outputted by the first plurality of configuration items, the configuration group information storing identifier identifying each of the first configuration groups in association with messages outputted by one or more configuration items included in the each of the first configuration groups,
      generate relation class information that defines, in association with the first configuration groups, first one or more message propagation relations indicating propagation relations of messages outputted by configuration items belonging to the first configuration groups, based on the configuration group information and propagation relations between messages outputted by the first plurality of configuration items, wherein a propagation relation between messages indicates a cause-effect relationship between a pair of configuration items and indicates a propagation of a message in which, within a predetermined period of time since an occurrence of a first event corresponding to a first message that was outputted from a configuration item at a propagation source, a second event derived from the first event at the propagation source occurs at a propagation destination, and, at the same time, a second message regarding the second event is outputted,
      classify a second plurality of configuration items of a second system into second configuration groups included in the first configuration groups, based on the configuration group information and second log information storing messages outputted by the second plurality of configuration items, and
      apply second one or more message propagation relations that are associated, by the relation class information, with third configuration groups included in the second configuration groups, to the second plurality of configuration items; and
   a memory to store the configuration group information and the relation class information.

2. The apparatus of claim 1, wherein
   the processor classifies the first plurality of configuration items into the first plurality of configuration groups by:
   associating one or more messages outputted by each of the first plurality of configuration items with the each of the first plurality of configuration items, and
   classifying configuration items each associated with the same one or more messages into one of the first plurality of configuration groups.

3. The apparatus of claim 1, wherein
   the processor generates the relation class information by classifying a plurality of message propagation relations that are associated with a pair of messages outputted by each pair of propagation source and destination configuration items, into one of the first one or more message propagation relations defined by the relation class information.

4. The apparatus of claim 1, wherein
   the processor classifies the second plurality of configuration items into the second plurality of configuration groups by:
   associating one or more messages outputted by each of the second plurality of configuration items with the each of the second plurality of configuration items, and
   classifying configuration items each associated with the same one or more messages into one of the second plurality of configuration groups, based on the first plurality of configuration groups.

5. The apparatus of claim 1, wherein,
   the processor identifies a pair of propagation source and propagation destination configuration items that are in the second plurality of configuration items and have outputted a pair of messages associated with one of the first one or more message propagation relations defined in the relation class information, based on the second log information of the second system;
   the processor identifies a pair of configuration groups that include the identified pair of propagation source and destination configuration items, respectively; and
   the processor applies the one of the first one or more message propagation relations to one or more pairs of configuration items that are included in the identified pair of configuration groups.

6. A method for managing systems each including a plurality of configuration items, the method comprising:
   generating configuration group information by classifying a first plurality of configuration items of a first system into first configuration groups each including one or more configuration items that have outputted messages having a commonality, based on first log information storing messages that were outputted by the first plurality of configuration items, so that the configuration group information stores identifier identifying each of the first configuration groups in association with messages outputted by the one or more configuration items included in the each of the first configuration groups;
   generating relation class information that defines, in association with the first configuration groups, first one or more message propagation relations indicating propagation relations of messages outputted by configuration items belonging to the first configuration groups, based on the configuration group information and propagation relations between messages outputted by the first plurality of configuration items, wherein a propagation relation between messages indicates a cause-effect relationship between a pair of configuration items and indicates a propagation of a message in which, within a predetermined period of time since an occurrence of a first event corresponding to a first message that was outputted from a configuration item at a propagation source, a second event derived from the first event at the propagation source occurs at a propagation destination, and, at the same time, a second message regarding the second event is outputted;

classifying a second plurality of configuration items of a second system into second configuration groups included in the first configuration groups, based on the configuration group information and second log information storing messages outputted by the second plurality of configuration items; and applying second one or more message propagation relations that are associated, by the relation class information, with third configuration groups included in the second configuration groups, to the second plurality of configuration items.

7. A non-transitory computer-readable recording medium storing instructions for allowing a computer system to execute a procedure for managing systems each including a plurality of configuration items, the procedure comprising:

generating configuration group information by classifying a first plurality of configuration items of a first system into first configuration groups each including one or more configuration items that have outputted messages having a commonality, based on first log information storing messages that were outputted by the first plurality of configuration items, so that the configuration group information stores identifier identifying each of the first configuration groups in association with messages outputted by the one or more configuration items included in the each of the first configuration groups;

generating relation class information that defines, in association with the first configuration groups, first one or more message propagation relations indicating propagation relations of messages outputted by configuration items belonging to the first configuration groups, based on the configuration group information and propagation relations between messages outputted by the first plurality of configuration items, wherein a propagation relation between messages indicates a cause-effect relationship between a pair of configuration items and indicates a propagation of a message in which, within a predetermined period of time since an occurrence of a first event corresponding to a first message that was outputted from a configuration item at a propagation source, a second event derived from the first event at the propagation source occurs at a propagation destination, and, at the same time, a second message regarding the second event is outputted;

classifying a second plurality of configuration items of a second system into second configuration groups included in the first configuration groups, based on the configuration group information and second log information storing messages outputted by the second plurality of configuration items; and applying second one or more message propagation relations that are associated, by the relation class information, with third configuration groups included in the second configuration groups, to the second plurality of configuration items.

* * * * *